US007140383B2

(12) United States Patent
Yamamoto et al.

(10) Patent No.: US 7,140,383 B2
(45) Date of Patent: Nov. 28, 2006

(54) INTAKE SYSTEM

(75) Inventors: Yoshiaki Yamamoto, Anjo (JP); Masao Ino, Toyota (JP)

(73) Assignee: Denso Corporation, Kariya (JP)

( * ) Notice: Subject to any disclaimer, the term of this patent is extended or adjusted under 35 U.S.C. 154(b) by 233 days.

(21) Appl. No.: 10/767,990

(22) Filed: Feb. 2, 2004

(65) Prior Publication Data

US 2004/0149258 A1 Aug. 5, 2004

(30) Foreign Application Priority Data

Jan. 31, 2003 (JP) ............................ 2003-023920

(51) Int. Cl.
*F16K 1/226* (2006.01)
*F16K 27/02* (2006.01)

(52) U.S. Cl. .............................. 137/454.2; 137/454.6; 251/305

(58) Field of Classification Search ............. 137/454.2, 137/454.6; 251/305; 138/92, 94
See application file for complete search history.

(56) References Cited

U.S. PATENT DOCUMENTS 2,564,402 A * 8/1951 MacArthur .................. 138/92
2,936,778 A * 5/1960 Stillwagon ............... 137/454.6
3,010,478 A * 11/1961 Buck et al. .................... 138/92
3,648,723 A * 3/1972 Nelson et al. ........... 137/454.6
4,423,749 A * 1/1984 Schmitt ................... 137/454.6
6,497,245 B1 * 12/2002 Torii ....................... 137/454.6

FOREIGN PATENT DOCUMENTS

JP 10-103089 4/1998

* cited by examiner

*Primary Examiner*—Stephen M. Hepperle
(74) *Attorney, Agent, or Firm*—Nixon & Vanderhye, P.C.

(57) ABSTRACT

An intake system has an intake pipe, a passage member which is inserted into a peripheral wall of the intake pipe in a radial direction to form an intake passage passing across a front end and a rear end thereof in a direction of insertion along with the intake pipe, a seal member which is arranged at a seam between the peripheral wall of the intake pipe and the passage member and seals the seam, and an elastic member which is made of the same material as that of the seal member and is interposed between the peripheral wall of the intake pipe and the front end of the passage member so as to be capable of giving the front end of the passage member an elastic reaction force in a direction perpendicular to the axis of the direction of insertion.

8 Claims, 4 Drawing Sheets

INTAKE SYSTEM

CROSS REFERENCE TO RELATED APPLICATION

This application is based upon, claims the benefit of priority of, and incorporates by reference Japanese Patent Application No. 2003-23920 filed Jan. 31, 2003.

BACKGROUND OF THE INVENTION

1. Technical Field of the Invention

The present invention relates to an intake system of an internal combustion engine, hereinafter referred to as an engine.

2. Description of the Related Art

In conventionally known intake systems, a passage member for forming the intake passage along with an intake pipe is inserted into a peripheral wall of the intake pipe in the radial direction for assembly. Among examples of the passage member is a throttle body which supports a throttle valve for opening and closing the intake passage.

In an intake system disclosed in Japanese Patent Laid-Open Publication No. Hei 10-103089 (1998), the passage member or throttle body is inserted through an insertion opening formed in the peripheral wall of the intake pipe, and the rear end of the throttle body in the direction of insertion is undetachably fixed to a part of the peripheral wall near the insertion opening. Furthermore, the front end of the throttle body in the direction of insertion is fastened to the peripheral wall by screws. The throttle body might vibrate in directions perpendicular to the axis of the direction of insertion due to collision of the intake air flowing through the intake passage, whereas the unstable front end of the throttle body is securely screwed to suppress the vibrations. The suppression of the vibrations of the throttle body prevents a seal member arranged at the seam between the peripheral wall of the intake pipe and the throttle body from wearing.

When the front end of the throttle body in the direction of insertion is fastened to the peripheral wall of the intake pipe by the screws, however, the screwing of the screw members causes a plastic deformation of the throttle body with a drop in the dimensional accuracy of the bore and the like. In addition, the screw fastening increases the parts count and complicates the assembling operation with an inevitable increase in cost.

SUMMARY OF THE INVENTION

An object of the present invention is to provide an intake system which is capable of easy component assembly and ensures the dimensional accuracy of the passage member. Besides, another object of the present invention is to provide an intake system that prevents the seal member arranged at the seam between the peripheral wall of the intake pipe and the passage member from wearing.

According to an intake system according to a first aspect of the present invention, a passage member is inserted into a peripheral wall of an intake pipe in the radial direction, and an elastic member is interposed between the peripheral wall and a front end of the passage member in the direction of insertion so as to be capable of giving the front end an elastic reaction force in a direction perpendicular to an axis of the direction of insertion. The passage member, undergoing such an elastic reaction force from the elastic member with its front end, is suppressed in displacement in the direction perpendicular to the axis of the direction of insertion, and thus becomes less prone to vibrate. Consequently, a seal member arranged at a seam between the peripheral wall of the intake pipe and the passage member is prevented from wearing. Moreover, since the elastic member, which causes no plastic deformation of the passage member, is interposed between the passage member and the intake pipe to suppress vibrations of the passage member, it is possible to ensure the dimensional accuracy of the passage member. In addition, the elastic member is integrally made of the same material as that of the seal member. This reduces the parts count and allows simultaneous, easy assembly of the elastic member and the seal member to predetermined positions.

According to the intake system according to a second aspect of the present invention, the peripheral wall of the intake pipe has an insertion opening for the passage member to be inserted through and a fitting part radially opposed to the insertion opening, while the fitting part and the front end of the passage member are fitted to each other with the elastic member interposed therebetween. According to this configuration, the passage member can be inserted into the peripheral wall of the intake pipe through the insertion opening so that the front end of the passage member is fitted to the fitting part for easy assembly of the passage member to the intake pipe. Moreover, the passage member is inserted into the intake pipe and fitted with the elastic member mounted on the front end of the passage member. The elastic member and the seal member can thus be easily, simultaneously assembled with the assembly of the passage member.

According to the intake system according to a third aspect of the present invention, the elastic member extends annularly around the axis of the direction of insertion between the fitting part and the front end of the passage member in a section perpendicular to the axis of the direction of insertion of the passage member. Consequently, the elastic member can give the front end of the passage member the elastic reaction force in any of directions perpendicular to the axis of the direction of insertion. This enhances the effect of suppressing vibrations of the passage member, and by extension, the effect of preventing the seal member from wearing.

According to the intake system according to a fourth aspect of the present invention, two seal members are arranged at seams between the passage member and the peripheral wall of the intake pipe so as to surround an inlet and an outlet of the intake passage formed in the passage member, respectively, and are further coupled via the elastic member. It is therefore possible to realize sealing facilities on both the inlet side and outlet side of the intake passage formed in the passage member while avoiding a deterioration in assemblability ascribable to the use of two seal members.

The intake system according to a fifth aspect of the present invention has a supporting means for supporting the rear end of the passage member in the direction of insertion so as not to make a displacement in the direction opposite to the direction of insertion. The passage member can thus be prevented from coming off the intake pipe, whereby the relationship in relative position among the passage member, the intake pipe, and the elastic member interposed therebetween is maintained. Consequently, an intended elastic reaction force can be obtained from the elastic member with stability.

According to the intake system according to a sixth aspect of the present invention, the passage member is a throttle body which supports a throttle valve for opening and closing the intake passage. The throttle body desirably has a small tolerance on the clearance occurring between the wall surface that forms the intake passage and the outer periphery of the throttle valve. Since the dimensional accuracy of the passage member or throttle body is ensured, it is possible to reduce the tolerance on the foregoing clearance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Hereinafter, an embodiment showing the mode of carrying out the present invention will be described with reference to the drawings.

Figure 1:
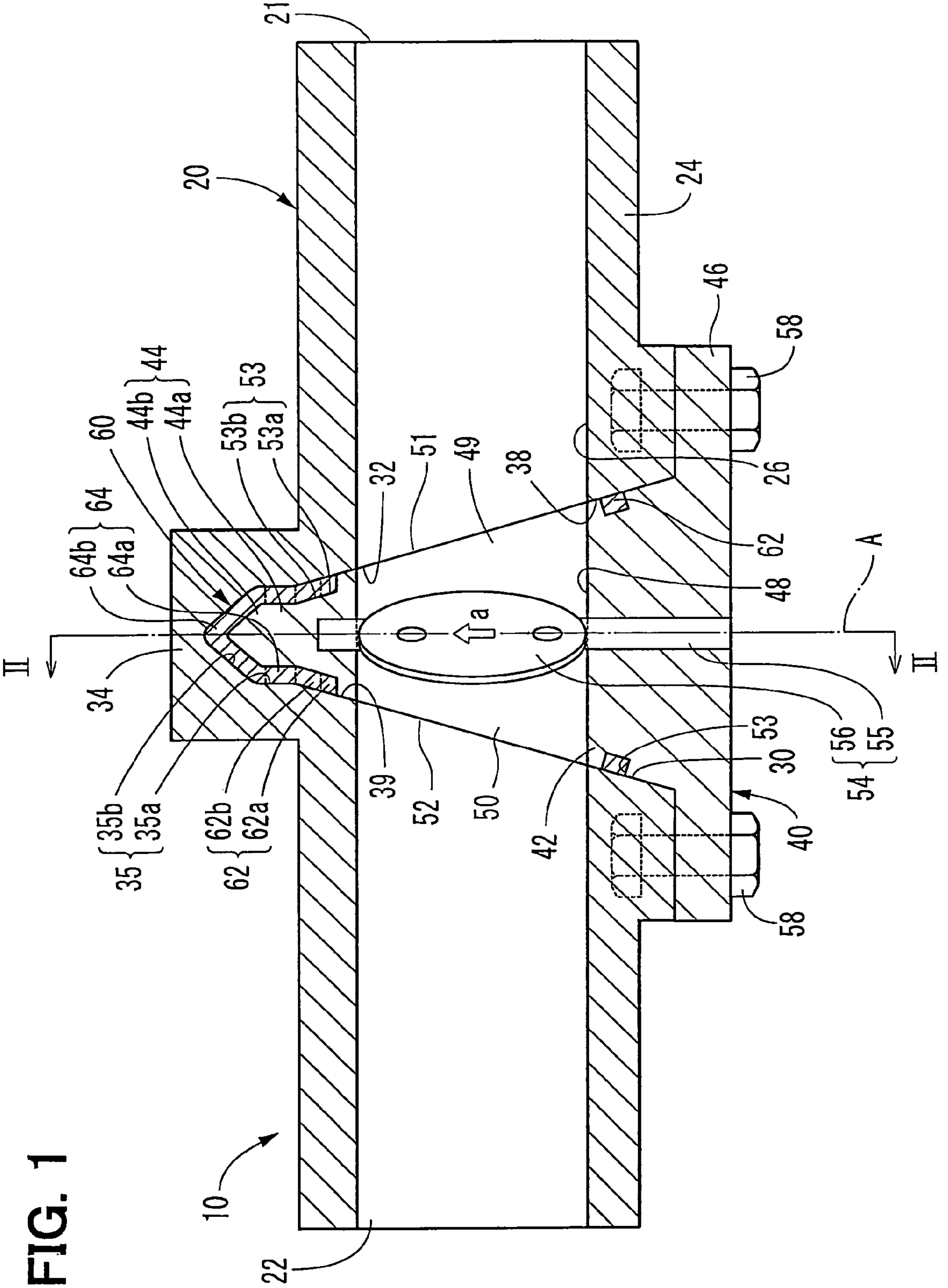
FIG. 1 is a cross-sectional view showing an intake system according to an embodiment of the present invention.
Figure 2:
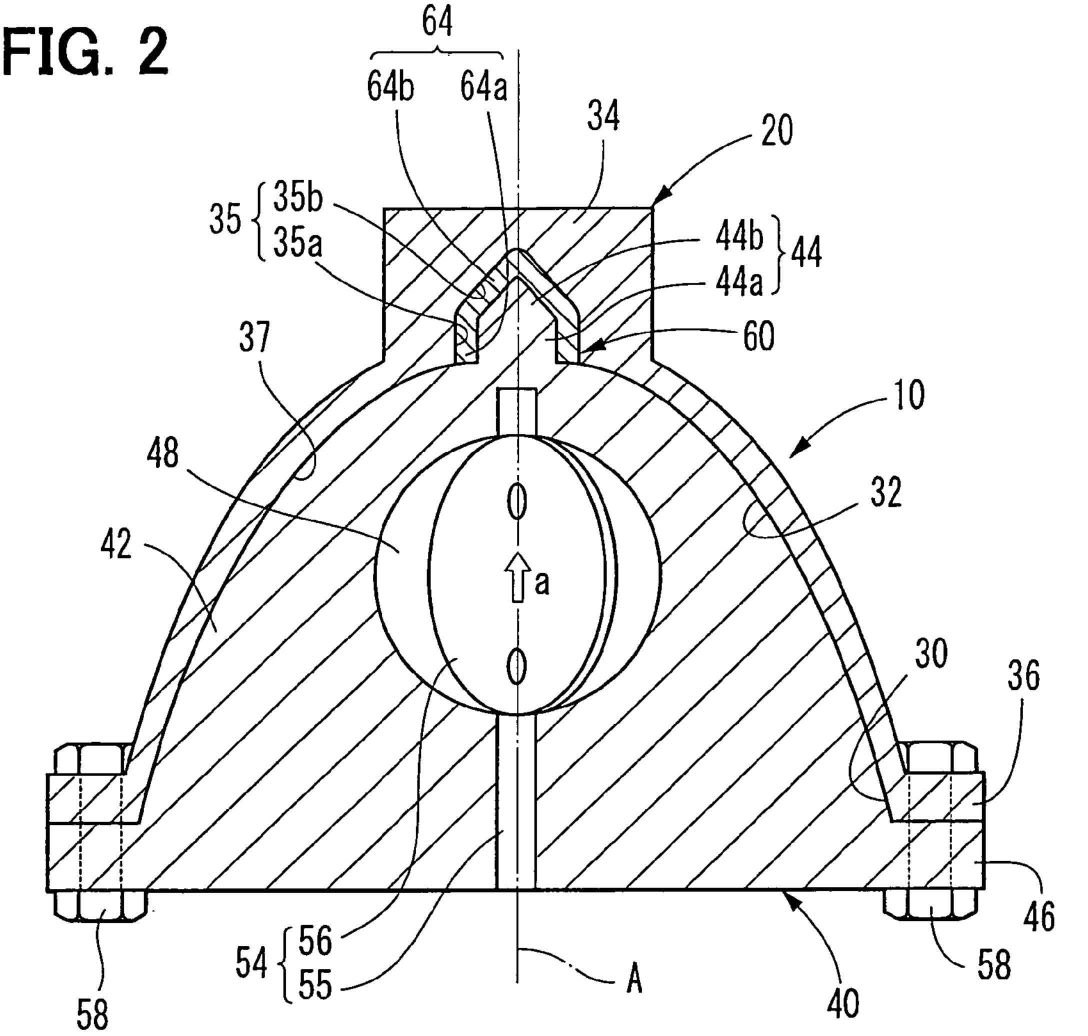
FIG. 2 is a cross-sectional view of FIG. 1 taken along the line II—II.
Figure 3:
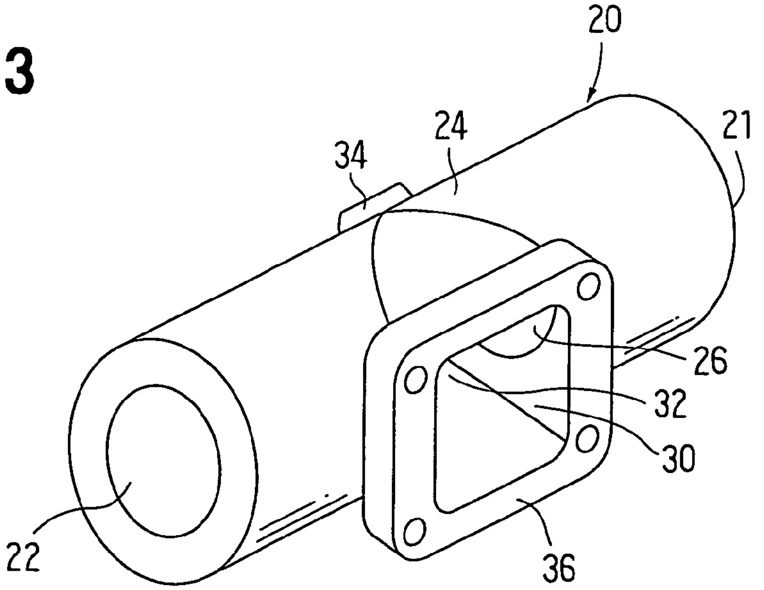
FIG. 3 is an external perspective view of the intake pipe shown in FIG. 1.

FIGS. 1 and 2 show an intake system of a vehicle engine according to the embodiment of the present invention. The intake system 10 comprises an intake pipe 20, a throttle body 40, and a gasket 60. As shown in FIGS. 1 to 3, the intake pipe 20 is of a metal material, for example, and formed in a generally cylindrical shape. An intake inlet 21 of the intake pipe 20 is connected to an intake outlet of an air cleaner (not shown). An intake outlet 22 of the intake pipe 20 is connected to an intake inlet of an intake manifold which is not shown. The intake pipe 20 has a peripheral wall 24 whose internal surface forms an intake passage 26. The intake passage 26 passes the intake air flowing into the intake inlet 21 from the air cleaner toward the intake outlet 22, guiding it to the intake manifold. Incidentally, the intake air guided to the intake manifold is supplied to the individual cylinders of the engine through the respective branch pipes of the intake manifold.

The peripheral wall 24 of the intake pipe 20 is provided with an insertion opening 30, a guide groove 32, a fitting part 34, and a flange 36. The insertion opening 30 pierces through an axial center of the peripheral wall 24 in the radial direction. The guide groove 32 is made in the inside surface of the peripheral wall 24 and extends along, but not fully around, the same circumference that the insertion opening 30 falls on. Both circumferential ends of the guide groove 32 are connected to both circumferential sides of the insertion opening 30, respectively. The fitting part 34 is arranged in a position radially opposite to the insertion opening 30. The fitting part 34 has a closed-ended fitting hole 35 which opens in a bottom wall surface 37 of the guide groove 32. The fitting hole 35 is composed of a cylindrical hole part **35*a* on the opening side and a tapered hole part 35*b* on the bottom side. The cylindrical hole part 35*a* extends with a constant diameter. The tapered hole part 35*b* decreases in diameter toward the bottom. The flange 36 is formed in a flat shape so as to spread over a tangential plane of the external surface of the peripheral wall 24 around the insertion opening 30**.

Figure 4:
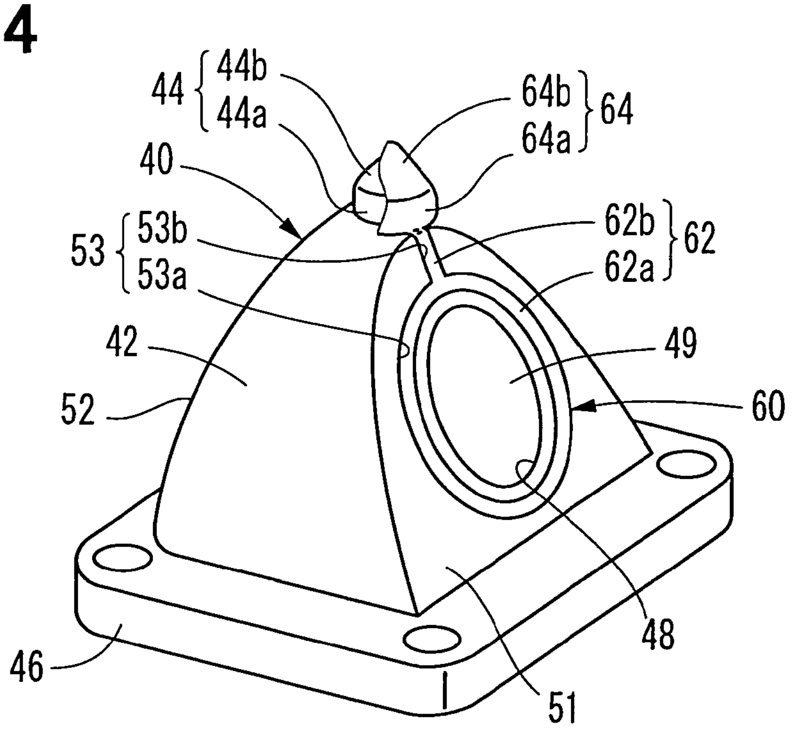
FIG. 4 is an external perspective view of the throttle body shown in FIG. 1.
Figure 5:
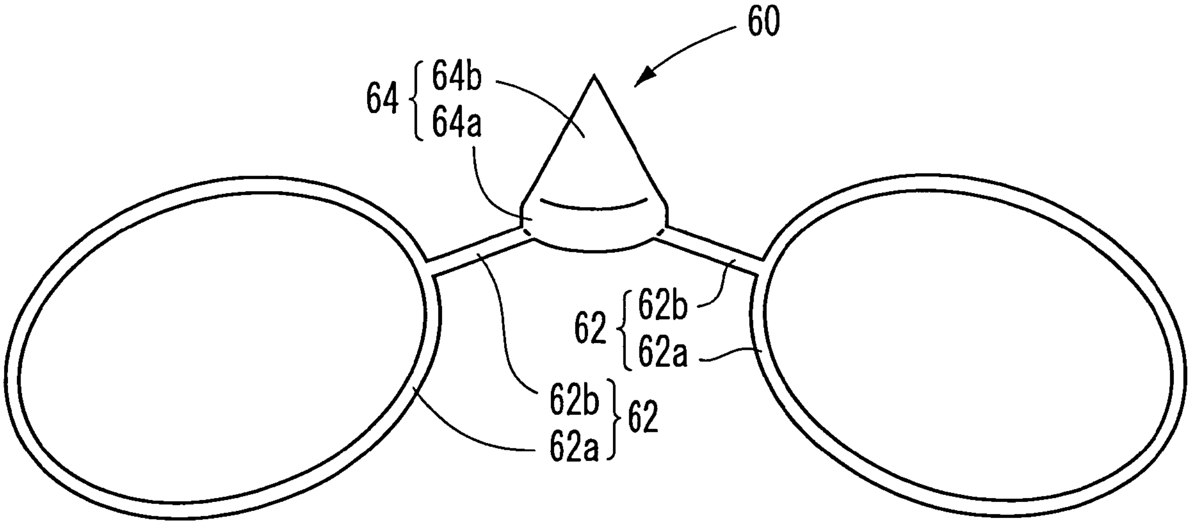
FIG. 5 is an external perspective view of the gasket shown in FIG. 1.

As shown in FIGS. 1, 2, and 4, the passage member or throttle body 40 is made of a metal material, for example, and has a main body 42, a fitting protrusion 44, and a flange 46. The main body 42 is formed in a so-called hog-backed shape, having a half-moon section. The main body 42 is inserted and fitted to the insertion opening 30 and the guide groove 32 in the peripheral wall 24 so that, in the half-moon section, the direction “a” from the center of the chord to the center of the arc coincides with the radial direction from the insertion opening 30 of the peripheral wall 24 to the fitting part 34. Such a direction “a” is the direction of insertion of the throttle body 40 into the peripheral wall 24.

A bore piercing through the main body 42 in the direction perpendicular to the half-moon section forms an intake passage 48. The intake passage 48 is arranged so as to interrupt the intake passage 26, formed by the intake pipe 20, in the middle. These intake passages 48 and 26 constitute a single continuous intake passage. The intake passage 48 passes the intake air from the inlet 49 toward the outlet 50 along the intake flow in the intake passage 26 upstream and downstream thereacross. A side surface 51 of the main body 42 on the side of the inlet 49 and a side surface 52 of the same on the side of the outlet 50 are in contact with a side wall surface 38 and a side wall surface 39 of the guide groove 32, respectively. The area of contact between the side surface 51 and the side wall surface 38 and the area of contact between the side surface 52 and the side wall surface 39 are the seams between the main body 42 and the peripheral wall 24. The side surfaces 51 and 52 of the main body 42 are provided with mounting grooves 53 at their respective seaming areas. The mounting grooves 53 each consist of a seal groove part **53*a* and a connection groove part 53*b*. The seal groove part 53*a* extends in an annular shape which surrounds the inlet 49 or the outlet 50 of the intake passage 48. The connection groove part 53*b* extends linearly between a portion of the seal groove part 53*a* right next to the base of the fitting protrusion 44 and the base of the fitting protrusion 44**.

The main body 42 supports a throttle valve 54. A throttle shaft 55 of the throttle valve 54 extends on the axis “A” in the direction of insertion “a” (hereinafter, referred to simply as insertion direction axis A) across the intake passage 48, and is rotatably supported by the main body 42. A valve body 56 of the throttle valve 54 is formed in a disk shape and accommodated in the intake passage 48. When the throttle shaft 55 is rotated by a driving unit (not shown), the valve body 56 opens and closes the intake passage 48. Here, the outer periphery of the valve body 56 and the bore internal surface of the main body 42 form a clearance, according to which the intake passages 48 and 26 are adjusted in intake flow rate.

The fitting protrusion 44 protrudes from a center area of the arc in the half-moon section of the main body 42, in a direction opposite from the chord of the half-moon section. This fitting protrusion 44 corresponds to the front end of the throttle body 40 in the direction of insertion “a.” The fitting protrusion 44 is fitted to the fitting hole 35 with an elastic part 64 of the gasket 60 interposed between the fitting protrusion and the fitting hole 35, so as to be coaxial with the fitting hole 35. The fitting protrusion 44 is composed of a column base part 44*a* at a base portion and a tapered protrusion part 44*b* at an extremity. The column base part 44*a* extends with a constant diameter, and is accommodated in the cylindrical hole part 35*a* of the fitting hole 35. The tapered protrusion 44*b* decreases in diameter toward the extremity, and is accommodated in the tapered hole part 35*b* of the fitting hole 35.

The flange 46 is arranged in the area of the chord in the half-moon section of the main body 42 and is formed in a flat shape perpendicular to the half-moon section. This flange 46 corresponds to the rear end of the throttle body 40 in the direction of insertion "a." The flange 46 is put over the flange 36 of the intake pipe 20 on the external side of the peripheral wall 24 and is fastened to the flange 36 by a plurality of screw members 58. The gasket 60 is made of a resin material having elasticity, and has seal parts 62 for serving as seal members and an elastic part 64 for serving as an elastic member as shown in FIGS. 1, 2, 4, and 5. The seal parts 62 and the elastic part 64 are formed by integral molding.

There are two seal parts 62, which are coupled with each other via the elastic part 64. The two seal parts 62 are fitted to the mounting grooves 53 in the side surfaces 51 and 52 of the main body 42, respectively. The seal parts 62 consist of a seal body 62*a* and a connection part 62*b* each. The seal body 62*a* is shaped like an O-ring, and is pressed into and held by the seal groove part 53*a* of the mounting groove 53. A surface of the seal body 62*a* opposite from the bottom wall surface of the seal groove part 53*a* is pressed against the side wall surface 38 or the side wall surface 39 of the guide groove 32. Consequently, the above-mentioned seams between the main body 42 and the peripheral wall 24 are sealed in an air-tight fashion both on the side of the inlet 49 and on the side of the outlet 50 of the intake passage 48. The connection part 62*b* is formed linearly so as to extend from a point on the circumference of the seal body 62*a*, and is pressed into and held by the connection groove part 53*b* of the mounting groove 53.

The elastic part 64 is shaped like a closed-ended cylinder. The elastic part 64 is interposed between the fitting hole 35 and the fitting protrusion 44 so that it extends annularly around the insertion direction axis A, between those components 35 and 44 in a section perpendicular to the insertion direction axis A. The elastic part 64 is composed of a cylindrical part 64*a* on the opening side and a tapered cylindrical part 64*b* on the bottom side. The cylindrical part 64*a* extends with a generally constant diameter, and fills the entire area between the cylindrical hole part 35*a* of the fitting hole 35 and the column base part 44*a* of the fitting protrusion 44 in the circumferential direction and axial direction. That is, the cylindrical part 64*a* is sandwiched between the inside surface of the cylindrical hole part 35*a* and the outside surface of the column base part 44*a* both of which are in parallel with the insertion direction axis A. The opening rim of the cylindrical part 64*a* is connected with the connection parts 62*b* of the respective seal parts 62 at two radially-opposed positions. The tapered cylindrical part 64*b* decreases in diameter toward the bottom, and fills the entire area between the tapered hole part 35*b* of the fitting hole 35 and the tapered protrusion part 44*b* of the fitting protrusion 44 in the circumferential direction and axial direction. That is, the tapered cylindrical part 64*b* is sandwiched between the inside surface of the tapered hole part 35*b* and the outside surface of the tapered protrusion part 44*b* which are parallel with each other and have lines oblique to the insertion direction axis A.

Next, description will be given of the method of mounting the throttle body 40 and the gasket 60 on the intake pipe 20 to assemble the intake system 10.

(1) The gasket 60 is attached to the throttle body 40 which is assembled with the throttle valve 54, the driving unit, and the like in advance. Specifically, the fitting protrusion 44 is initially pressed into the elastic part 64. Then, the seal parts 62 are pressed into the respective mounting grooves 53.

(2) The throttle body 40 is inserted into the peripheral wall 24 of the intake pipe 20 in the direction of insertion "a." Specifically, the throttle body 40 is initially inserted through the insertion opening 30 of the peripheral wall 24 with the fitting protrusion 44 first. Then, the fitting protrusion 44 is fitted into the fitting hole 35 of the peripheral wall 24 while the main body 42 is guided by the side wall surfaces 38 and 39 of the guide groove 32. Consequently, the outer periphery of the main body 42 which forms the arc of the half-moon section and the end of the main body 42 which forms the chord of the half-moon section are inserted and fitted to the guide groove 32 and the insertion opening 30, respectively. At the same time, the parts 62 and 64 of the gasket 60 are set into their respective predetermined positions.

(3) The flange 36 of the intake pipe 20 and the flange 46 of the throttle body 40 are fastened at a plurality of points by the screw members 58.

As described above, the gasket 60 is attached to the throttle body 40, and the throttle body 40, kept in the attached state, is inserted into the peripheral wall 24 of the intake pipe 20. The throttle body 40 and the gasket 60 can thus be simultaneously assembled with the intake pipe 20. In addition, the assembly of the gasket 60 consisting of the two seal parts 62, integrated with the elastic part 64, can reduce assembly errors, such as dropout and bite, as compared to the cases where the two seal parts 62 and the elastic part 64 are assembled as separate members.

In the intake system 10 described above, the elastic part 64 is sandwiched between the fitting hole 35 and the fitting protrusion 44 in any of the directions perpendicular to the insertion direction axis A. Thus, when the intake air flowing through the intake passages 26 and 48 causes a displacement of the throttle body 40 relative to the intake pipe 20 in a direction perpendicular to the insertion direction axis A, such as the axial direction of the intake pipe 20, the elastic part 64 is elastically compressed by the fitting hole 35 and the fitting protrusion 44 at the front area in the direction of the relative displacement. Then, the compressed area of the cylindrical part 64*a* of the elastic part 64 exerts an elastic reaction force on the column base part 44*a* of the fitting protrusion 44 in the direction opposite to the direction of the relative displacement of the throttle body 40. Moreover, the compressed area of the tapered cylindrical part 64*b* of the elastic part 64 can exert an elastic reaction force component on the tapered protrusion part 44*b* of the fitting protrusion 44 in the direction opposite to the direction of the relative displacement of the throttle body 40. Since the parts 44*a* and 44*b* of its fitting protrusion 44 receive the foregoing elastic reaction force and the foregoing elastic reaction force component from the parts 64*a* and 64*b* of the elastic part 64, the throttle body 40 is limited in displacement in the direction of the relative displacement. Since the elastic part 64 extending annularly around the insertion direction axis A is capable of applying the elastic reaction force in any of the directions perpendicular to the insertion direction axis A, vibrations of the throttle body 40 in any of the directions perpendicular to the insertion direction axis A are suppressed.

Consequently, in the intake system 10, the elastic part 64 elastically supports the fitting protrusion 44, suppressing vibrations of the throttle body 40. The seal parts 62 arranged at the seams between the main body 42 and the peripheral wall 24 are thus less prone to wear. Besides, since the vibrations of the throttle body 40 are suppressed not by conventional screw members but by the elastic part 64, which causes no plastic deformation of the throttle body 40, it is possible to ensure the dimensional accuracy of the throttle body 40. This allows a smaller tolerance on the clearance formed between the outer periphery of the valve body 56 and the bore internal surface of the main body 42.

Furthermore, in the intake system 10, the flange 46 of the throttle body 40 is fastened to the flange 36 of the intake pipe 20 by the screw members 58, whereby the throttle body 40 is supported so as not to make a displacement from the intake pipe 20 in the direction opposite to the direction of insertion "a." The throttle body 40 is thus prevented from coming off the intake pipe 20, so that the fitting hole 35, the fitting protrusion 44, and the elastic part 64 between these components 35 and 44 are maintained in a generally constant relationship with regard to relative position. As a result, an intended elastic reaction force is obtained from the elastic part 64 with stability.

In the present embodiment, the screw members 58 constitute the supporting means. Additionally, the gasket 60 of the intake system 10 has the elastic part 64 aside from the seal parts 62. The seal parts 62 and the elastic part 64 can thus be configured separately so as to have a shape capable of sealing the seams between the main body 42 and the peripheral wall 24 and a shape capable of elastically supporting the fitting protrusion 44, respectively.

Incidentally, in the foregoing embodiment, the throttle body 40 for supporting the throttle valve 54 is adopted as the passage member. Nevertheless, various types of members capable of being inserted into the peripheral wall of the intake pipe to form the intake passage along with the intake pipe may be adopted as the passage member of the present invention.

Additionally, in the foregoing embodiment, the two seal parts 62, which surround the inlet 49 and the outlet 50 of the intake passage 48 formed in the throttle body 40, and the elastic part 64 are integrally formed of the same material (resin material). However, either one of the seal parts 62 alone may be formed integrally with the elastic part 64.

Moreover, in the foregoing embodiment, the peripheral wall 24 of the intake pipe 20 is provided with the fitting part 34 having the fitting hole 35, and the throttle body 40 is provided with the fitting protrusion 44 to be fitted to the fitting hole 35. Conversely, the peripheral wall 24 of the intake pipe may be provided with a fitting part 34 having a fitting protrusion while the throttle body 40 is provided with a fitting hole to be fitted with the fitting protrusion. Even in this case, an elastic part 64 corresponding to the shape of the gap between the fitting protrusion of the fitting part 34 and the fitting hole of the throttle body 40 is arranged in the gap.

Figure 6:
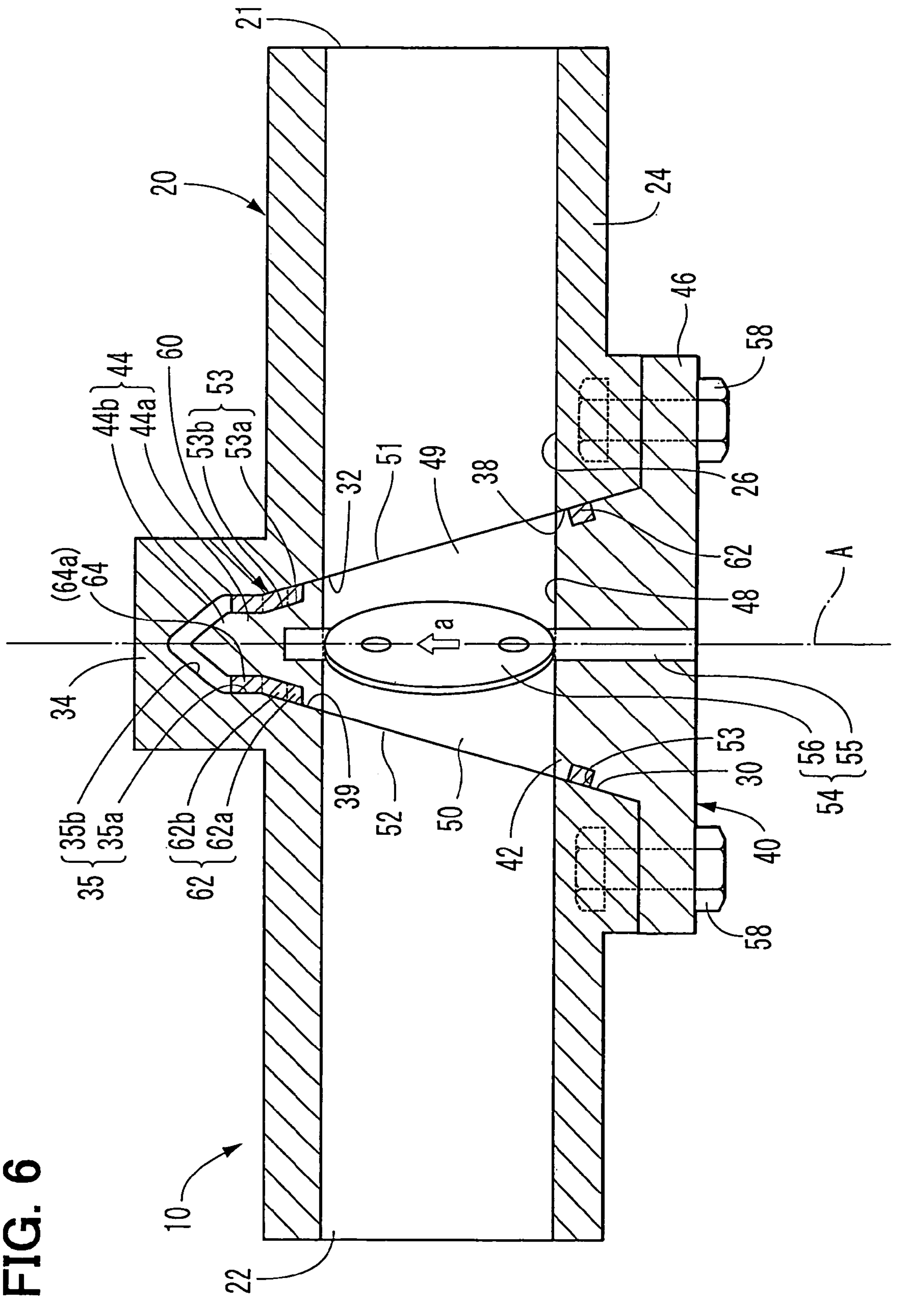
FIG. 6 is a cross-sectional view showing a modified example of the intake system according to the embodiment of the present invention.

Furthermore, in the foregoing embodiment, the elastic part 64 is arranged so as to fill the entire area between the fitting protrusion 44 and the fitting hole 35 in the axial direction. Nevertheless, as in a modified example shown in FIG. 6, the elastic part 64 may be arranged so as to fill part of the area between the fitting protrusion 44 and the fitting hole 35 in the axial direction. Incidentally, in the modified example shown in FIG. 6, the elastic part 64 consists solely of a component corresponding to the cylindrical part 64*a* of the foregoing embodiment.

Additionally, in the foregoing embodiment, the supporting means consists of the screw members 58. Nevertheless, the supporting means may be composed of, for example, a clamp or the like that can give the peripheral wall 24 a force for sandwiching the main body 42 near the insertion opening 30 of the peripheral wall 24. In this case, the end of the main body 42 to be sandwiched near the insertion opening 30 of the peripheral wall 24 corresponds to the rear end of the throttle body 40 in the direction of insertion "a."

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An intake system comprising:

an intake pipe;

a passage member having a front end and a rear end and which is inserted front end first into a peripheral wall of said intake pipe in a radial direction to form with a bore of said intake pipe an intake passage passing transverse to the direction of insertion;

a seal member which is arranged at a seam between said peripheral wall and said passage member and seals the seam; and an elastic member interposed around said front end, between said peripheral wall and said front end so as to be capable of giving said front end an elastic reaction force in a direction perpendicular to an axis of the direction of insertion, wherein said passage member is a throttle body that supports a throttle valve for opening and closing said intake passage.

2. The intake system according to claim 1, wherein said peripheral wall of said intake pipe defines an insertion opening for said passage member to be inserted through and a fitting part diametrically opposed to said insertion opening, and said fitting part and said front end are fitted to each other with said elastic member interposed therebetween.

3. The intake system according to claim 2, wherein said elastic member extends annularly around the axis of said direction of insertion, between said fitting part and said front end in a section perpendicular to the axis of said direction of insertion.

4. The intake system according to claim 1 wherein, the number of said seal members is two and said two seal members are arranged at said seams so as to surround an inlet and an outlet of said intake passage formed in said passage member, respectively, and are further coupled via said elastic member.

5. The intake system according to claim 1, further comprising:

supporting means for supporting said rear end so the rear end does not make a displacement in a direction opposite to the direction of insertion.

6. An intake system comprising:

an intake pipe having a peripheral wall and a bore defined along a longitudinal axis thereof, said peripheral wall having an opening defined therein in a direction transverse to said longitudinal axis;

a passage member having a longitudinal axis, a front end and a rear end, and inserted front end first into said opening in said peripheral wall so that said longitudinal axis of said passage member is disposed transverse to said longitudinal axis of said intake pipe, said passage member having an intake passage defined therethrough and aligned with said bore of said intake pipe;

said intake passage of said passage member having an inlet end and an outlet end;

a first seal member disposed at a first junction between said peripheral wall and said passage member so as to surround said inlet end of said intake passage of said passage member to seal said first junction;

a second seal member disposed at a second junction between said peripheral wall and said passage member to surround said outlet end of said intake passage to seal said seal junction; and an elastic member disposed around said front end between said peripheral wall and said front end of said passage member so as to provide an elastic reaction force in a direction perpendicular to the direction of insertion, wherein said passage member is a throttle body that supports a throttle valve for opening and closing said intake passage.

7. The intake system according to claim 6, wherein said first and second seal members are coupled to said elastic member.

8. The intake system according to claim 6, further comprising at least one fastener fastening said flange to said peripheral wall so that displacement in a direction opposite the insertion direction is prevented.

* * * * *